United States Patent [19]

McClean et al.

[11] Patent Number: 5,479,851
[45] Date of Patent: Jan. 2, 1996

[54] FRUIT AND VEGETABLE JUICER

[75] Inventors: Stephen J. McClean, Beverly Hills; Richard W. Yallop, Hurstville, both of Australia

[73] Assignee: Breville Pty Ltd., Pyrmont, Australia

[21] Appl. No.: 433,606

[22] Filed: May 3, 1995

[30] Foreign Application Priority Data

May 25, 1994 [AU] Australia .................... PM5869
Feb. 13, 1995 [AU] Australia .................... PN1087

[51] Int. Cl.$^6$ ............................ A23N 1/02
[52] U.S. Cl. .................. 99/512; 99/513; 210/360.1
[58] Field of Search ............... 99/495, 510–513, 99/509, 484, 536; 210/360.1, 380.1, 369; 241/37.5, 92, 282.1, 282.2; 366/314, 601; 100/116

[56] References Cited

U.S. PATENT DOCUMENTS

| | | | |
|---|---|---|---|
| 2,109,048 | 2/1938 | Lorenzen | 99/512 |
| 2,273,093 | 2/1942 | Drachenberg | 99/511 |
| 2,302,138 | 11/1942 | Nicholson | 99/512 |
| 2,311,379 | 2/1943 | Gillanders | 99/512 |
| 2,325,779 | 8/1943 | Kraber | 99/512 |
| 2,481,010 | 9/1949 | Gundelfinger | 99/512 |
| 2,527,695 | 10/1950 | Bennett | 99/511 |
| 4,183,293 | 1/1980 | Arao et al. | 99/513 |
| 4,345,517 | 8/1982 | Arao et al. | 99/511 |
| 4,681,031 | 7/1987 | Austad | 99/511 |
| 4,700,621 | 10/1987 | Elger | 99/511 |
| 5,031,522 | 7/1991 | Brixel et al. | 210/360.1 |

FOREIGN PATENT DOCUMENTS 0377111 7/1990 European Pat. Off. ............. 99/511

Primary Examiner—Timothy F. Simone
Attorney, Agent, or Firm—Michael J. Striker

[57] ABSTRACT

A fruit and vegetable juicer has a rotatable horizontal grating disc integral with and surrounded by a substantially frusto-conical filter sieve the sides of which project upwardly and outwardly from the grating disk, a feed tube arranged above the disc and a food pusher insertable into the tube to press food down on to the grating disc for grating, pulp and juice thereby produced flying upwardly and outwardly, the juice passing through the filter and the pulp passing over the filter for subsequent collection. The juicer is characterized in that the feed tube has an internal diameter substantially the same as that of the grating disc, there being provided in the tube a knife or knives having an upwardly directed cutting edge, the knife or knives being attached to and supported by the tube, the food pusher being bifurcated or otherwise shaped to pass downwardly past the knife or knives, downward movement thereof causing an article of food to be cut by the cutting edge or edges of the knife or knives and pressed onto the grating disc, the food being held against rotation by the knife or knives.

8 Claims, 5 Drawing Sheets

FRUIT AND VEGETABLE JUICER

BACKGROUND OF THE INVENTION

The present invention relates to a fruit and vegetable juicer of the kind in which a fruit or vegetable to be juiced is forced downwardly onto a rotating horizontal disc having grating teeth. The horizontal disc is circular and is mounted for rotation about a vertical axis. It is integral with and surrounded by a frusto-conical sieve. Juice is extracted from a fruit or vegetable by pressing it onto the rotating disc which grates material from the surface of the fruit or vegetable at the same time releasing the juice. The grated material or pulp and the juice are thrown upwardly and outwardly by centrifugal force against the sloping surface of the filter. The pulp carries on over the edge of the filter and is caught in a suitable receptacle. The finely filtered juice passes through the filter into another receptacle.

Such fruit and vegetable juicers are well known and function satisfactorily. All those available on the market do however have one drawback and that is that it has not been hitherto possible to make full use of the circular grating surface of the disc because it is necessary to reduce the size of the passage through which the material to be juiced is fed to the grating disc in order to ensure that the material is held against rotation with the disc. For this reason existing fruit and vegetable juicers are not as efficient as they might be.

SUMMARY OF THE INVENTION

The object of the present invention is to provide a fruit and vegetable juicer of the kind set forth in which full use can be made of the entire grating surface of the disc.

The present invention consists in a fruit and vegetable juicer of the kind comprising a rotatable substantially horizontal grating disc integral with and surrounded by a substantially frusto-conical sieve the sides of which project upwardly and outwardly from the grating disk, a feed tube arranged above the disc and a food pusher insertable into the tube to press food down on to the grating disc for grating, pulp and juice thereby produced flying upwardly and outwardly, the juice passing through the filter and the pulp passing over the filter for subsequent collection characterised in that the feed tube has an internal diameter substantially the same as that of the grating disc, there being provided in the tube a knife or knives having an upwardly directed cutting edge, the knife or knives being attached to and supported by the tube the food pusher being bifurcated or otherwise shaped to pass downwardly past the knife or knives, downward movement thereof causing an article of food to be cut by the cutting edge or edges of the knife or knives and pressed onto the grating disc, the food being held against rotation by the knife or knives.

It is preferred that the grating disc has at its centre means for abrading or otherwise removing that part of the fruit or vegetable lying on the axis or close to the axis of the grating disc.

While it is preferred that the grating dish should be flat, it may be frusto-conical sloping up towards the middle.

In order that the nature of the invention may be better understood, a preferred form thereof is hereinafter described, by way of example, with reference to the accompanying drawings:

DESCRIPTION OF THE PREFERRED EMBODIMENTS

Figure 1:
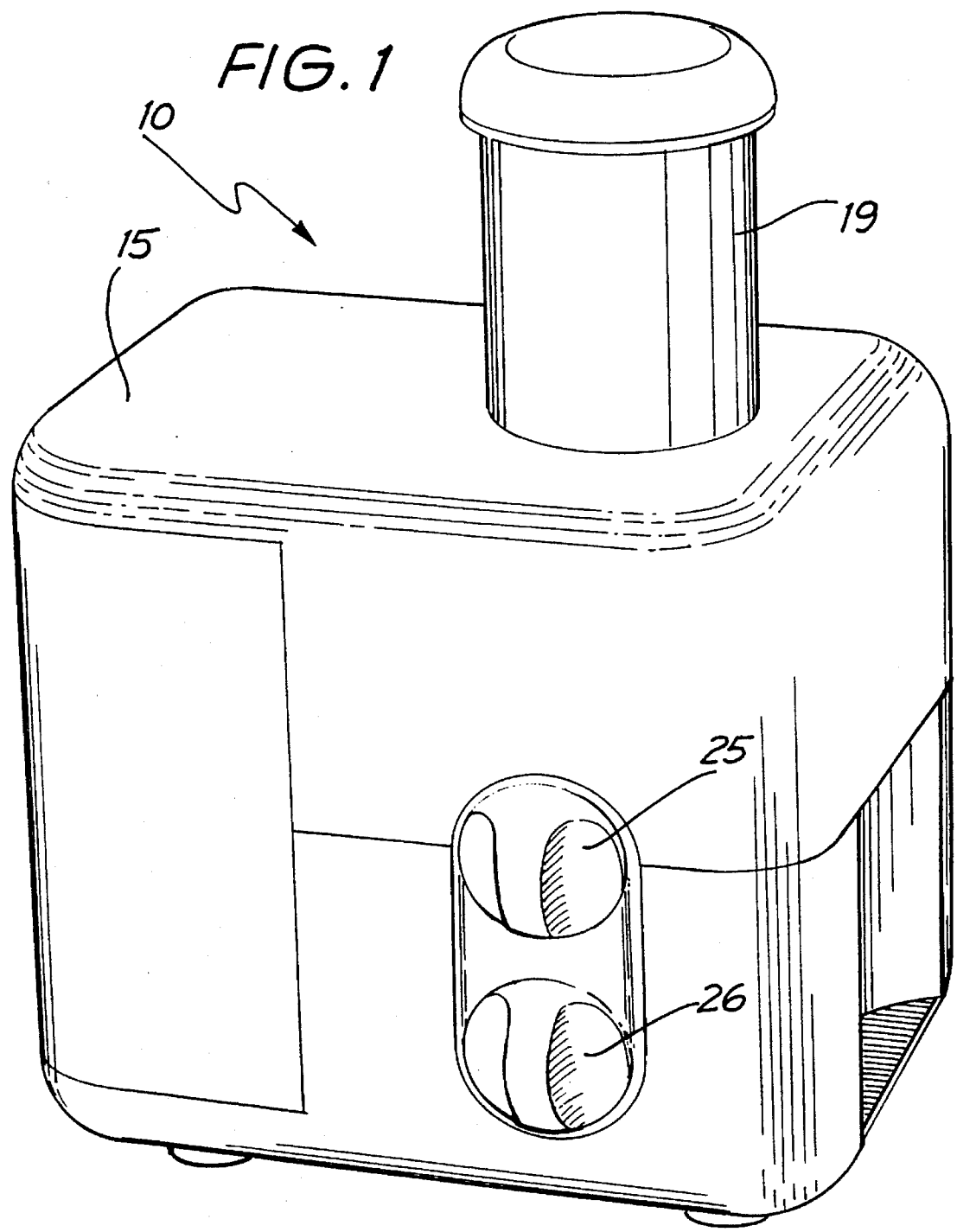
FIG. 1 is a perspective view showing the external appearance of a fruit and vegetable juicer incorporating the invention.

The fruit and vegetable juicer shown in FIG. 1 consists of a casing 10 which accommodates the working parts of the apparatus including an electric motor 11. Associated with the casing 10 is a removable juice receptacle 12.

The motor 11 drives the shaft 11a which drives a grating disc 13 at high speed. The grating disc is integral with and surrounded by a sieve member 14 that is generally frusto-conical in shape and which is provided on its sloping surface with very fine openings through which juice can pass. The sieve member 14 may be made of very fine mesh expanded stainless steel. This has been found to give superior results to the type of material conventionally used, particularly in its ability to shed fibres and not clog.

The casing 10 has a cover 15 which is formed integrally with a feed tube 16. The casing 10 also accommodates a fibre collecting container indicated at 12a. The majority of features described to this point are generally conventional and are to be found in most fruit and vegetable juicers.

A juicer according to the present invention is distinguished by the fact that the internal diameter of the feed tube 16 is substantially the same as the diameter of the grating disc 13. While from the functional point of view it is not necessary for the feed tube 16 to be the same as the diameter of the grating disc, as the main object of the invention is to enable as much of the grating disc to be used as possible it is clearly desirable that the area covered by the feed tube should be as large as possible. Preferably the feed tube 16 is slightly smaller at its upper end than further down. This ensures that any piece of fruit that can be introduced into the upper end of the tube can pass freely down it.

In one form of construction according to the present invention there is provided in the tube 16 a knife 17 which is preferably a stainless steel member having a sharpened upper edge 18. In the particular forms of the invention illustrated the upper edge 18 is V-shaped. While it is preferred that the knife 17 should extend across the feed tube for reasons of strength this is not absolutely necessary and the knife or knives may take any form in which it or they is or are effective to hold a fruit or vegetable against rotation provided that it is or they are held against rotation by being attached to and supported by the tube 16.

In the preferred embodiment the feed tube 16 is provided with a series of longitudinally extending grooves separated by intervening lands to reduce friction on fruit or vegetables being introduced into the tube 16.

Figure 2:
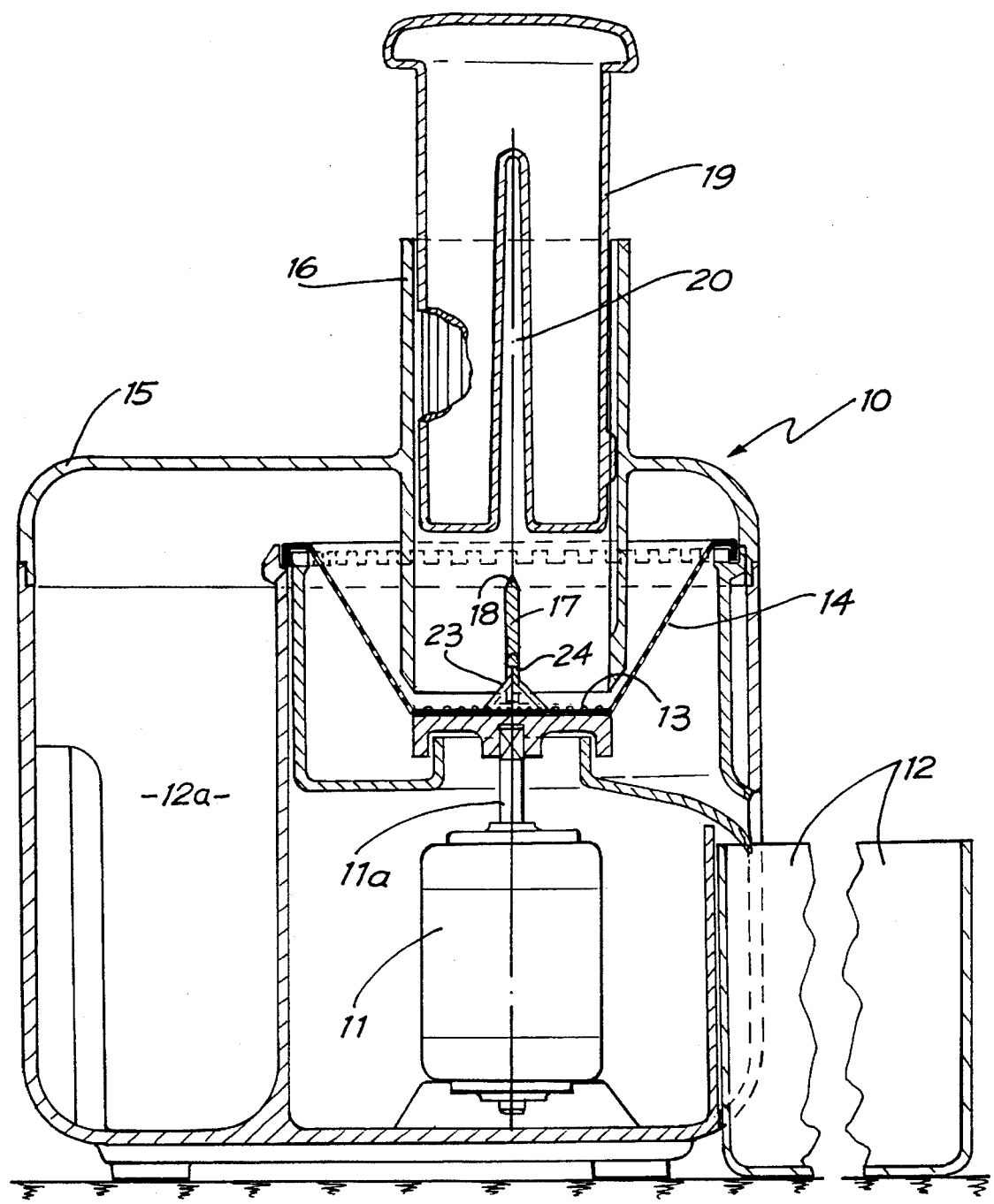
FIG. 2 is a cross-sectional view through the center of the feed tube.
Figure 3:
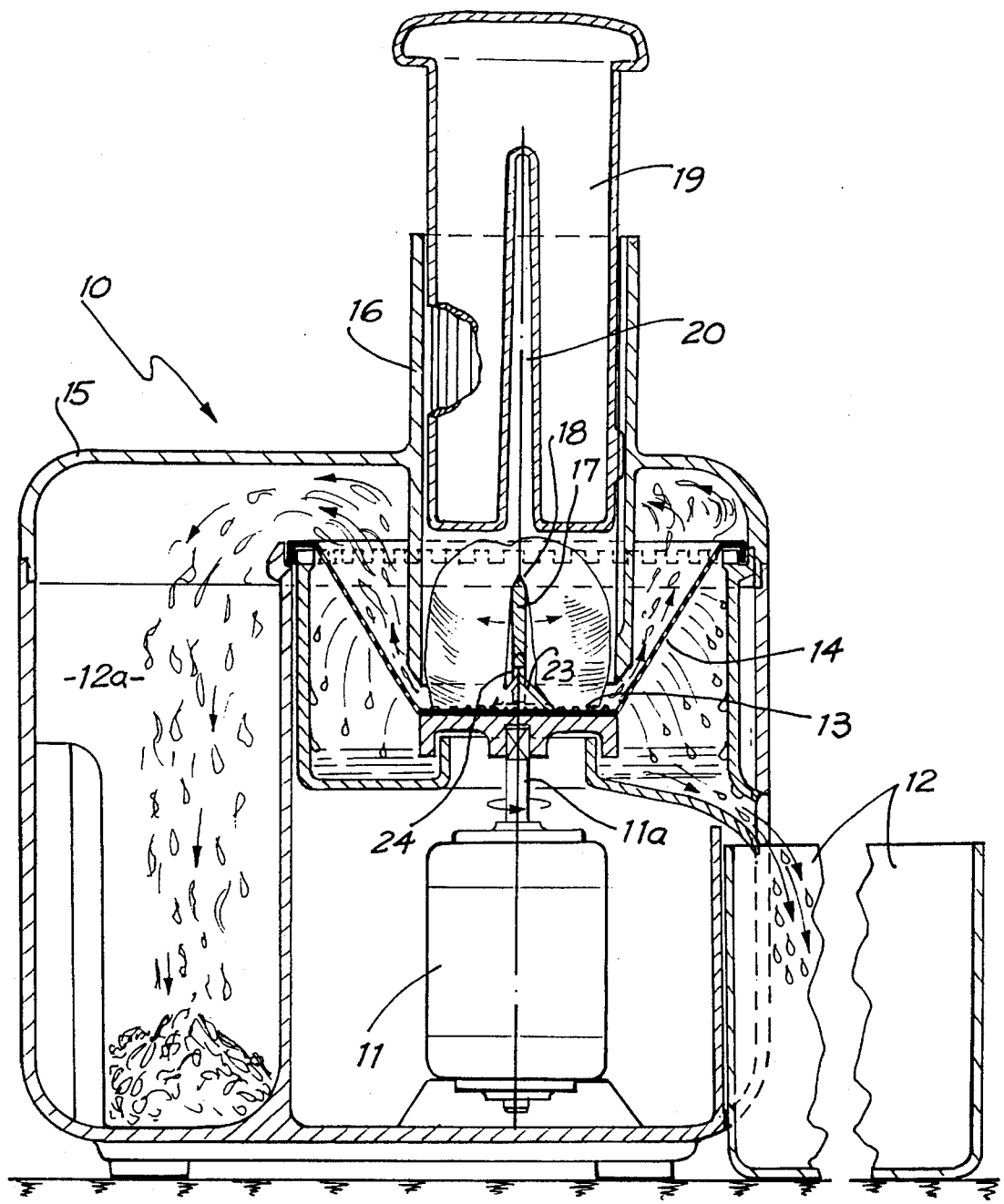
FIG. 3 is a view similar to FIG. 2 showing the apparatus in use.
Figure 4:
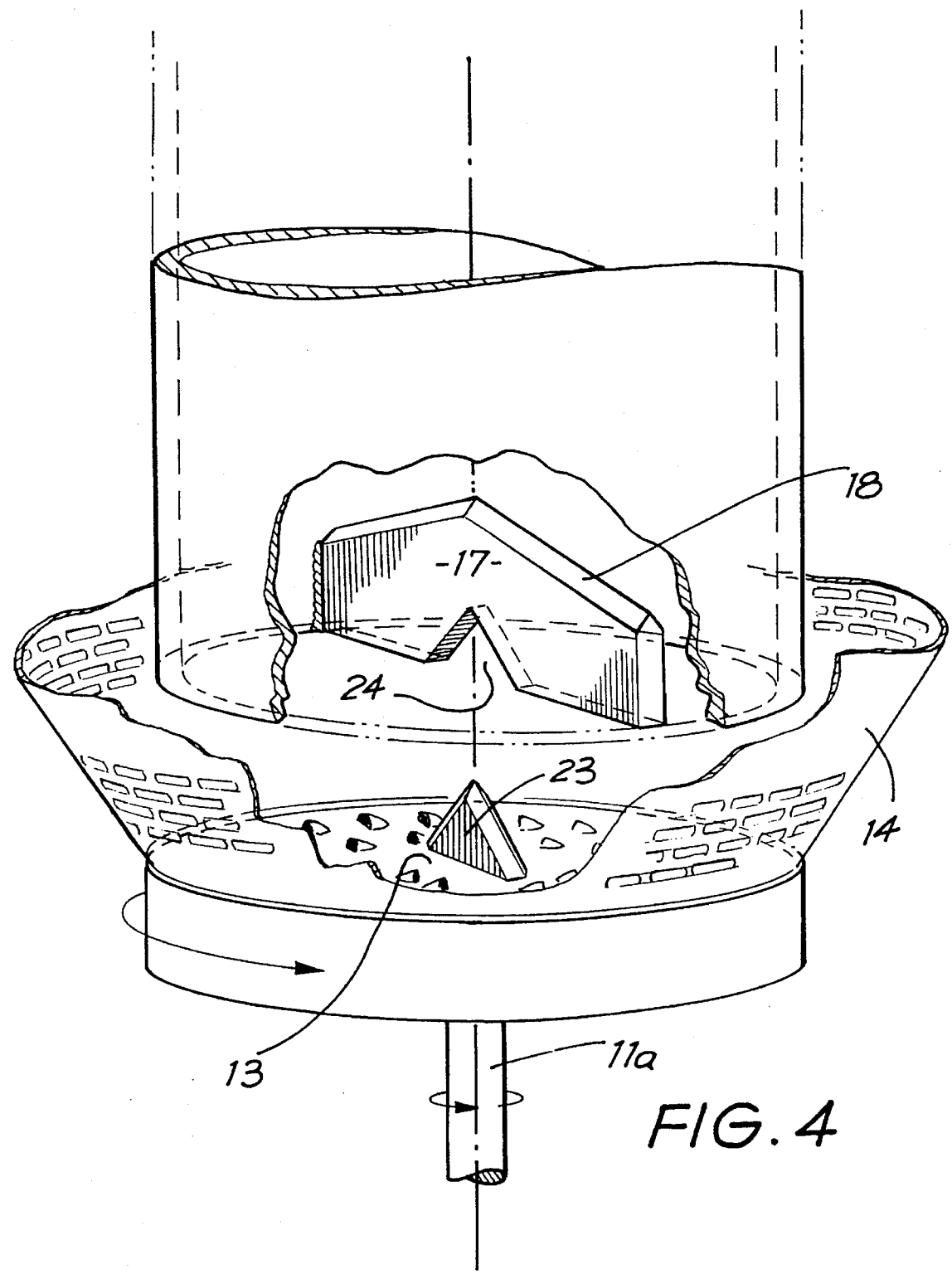
FIG. 4 is an enlarged perspective view of a portion of the machine showing the shape of the knife.

In order to push food down on to the grating disc 13 there is provided a food pusher 19 and as is best seen in FIGS. 2 and 3, the food pusher 19 is bifurcated to leave a central space 20 so that when it is pushed down it passes on either side of the knife 17. To assist in correct orientation of the food pusher 19 in the guide tube 16, the food pusher is provided with a lug (not shown) which runs in a groove (not shown) provided in the feed tube 16.

Experimental work has shown that the grating disc is not entirely effective in abrading the central part of any food or vegetable lying on or close to the axis of the grating disc due to the relatively slow linear speed of points on the disc near the axis. It has been found that superior results can be obtained by providing at the center of the disc an additional means for abrading the central part of the fruit or vegetable. In the embodiments of the invention shown this is accomplished by means of a triangular piece of steel 23 arranged at the center of the grating disc 13 and having sharpened upper edges. In the preferred embodiments this is accommodated by providing a V shaped aperture 24 in the knife 17.

In use, an item of food such as for example an apple, is inserted in the feed tube 16. The food pusher 19 is then inserted on top of it and pushes the apple or other item of foodstuff on to the edge 18 which cuts it into two halves which move downwardly on either side of the knife 17 and are then prevented from rotating and are pressed on to the grating disc 13 by downward pressure on the food pusher. The action of the grating disc 13 is to grate the apple to produce both juice and pulp. As is best seen in FIG. 3 the juice passes through the filter 14 and down into the juice receptacle 12 as illustrated. The pulp or fibre passes, by centrifugal force, over the edge of the filter 14 into the receptacle 17 as shown in FIG. 1. The bottom surface of the food pusher 19 is made smooth to facilitate cleaning.

As seen in FIG. 1, the casing 10 has external manually operable control knobs 25 and 26. The knob 25 controls a lock (not shown) which holds the cover 15 of the casing 10 in place. Turning the knob 25 enables the cover 15 to be removed. It simultaneously disconnects the electrical supply to the motor so that the apparatus cannot be operated with the cover 15 removed. The other knob 26 is an on/off switch controlling the electrical supply to the motor 11.

The significant feature of the construction is that substantially the whole area of the grating disc is available for use whereas in presently available constructions only a portion of this area can be used at any one time due to the necessity for providing some means of holding the foodstuff being juiced against rotation.

In the case of the present invention this function is performed by the knife 17.

Figure 5:
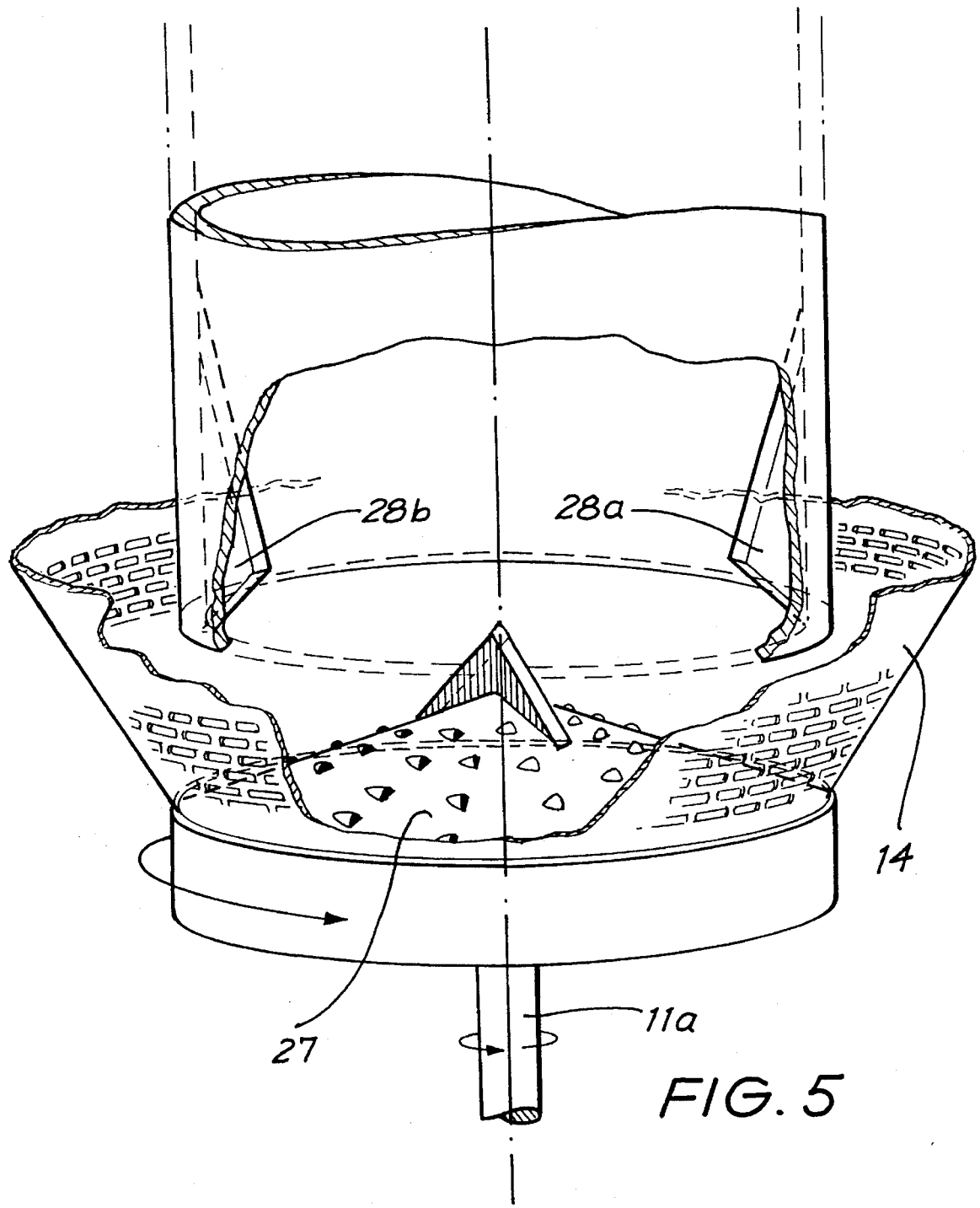
FIG. 5 is a view similar to FIG. 4 showing an alternative form of construction.

As stated above, the knife may take various forms. An alternative form is illustrated in FIG. 5 in which the grating disc 27 is conical in shape its surface sloping up to its axis. In this construction, the knife is in two parts 28a and 28b each secured to the side of the tube 16 and each having a sharpened upper cutting surface. The food pusher is suitably shaped to enable it to pass the knives 28a and 28b. It has been found that this arrangement is particularly effective in dealing with elongated foodstuff such as carrots, the ends of which are held by the portions of the knife against rotating while being abraded by the disc 27.

It will be appreciated by persons skilled in the art that numerous variations and/or modifications may be made to the invention as shown in the specific embodiments without departing from the spirit or scope of the invention as broadly claimed. The present embodiments are, therefore, to be considered in all respects as illustrative and not restrictive.

It will be understood that each of the elements described above, or two or more together, may also find a useful application in other types of constructions differing from the types described above.

While the invention has been illustrated and described as embodied in a fruit and vegetable juicer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

We claim:

1. A fruit and vegetable juicer, comprising a horizontal grating disc rotatable about a substantially vertical axis; a substantially frusto-conical filter sieve surrounding said grating disc and being integral with said grating disc, said filter sieve having sides which project upwardly and outwardly from said grating disc; a feed tube arranged above said grating disc; a food pusher insertable into said feed tube and pressing fruit and vegetable down onto said grating disc for grating so that pulp and juice thereby produced fly upwardly and outwardly and the juice pass through said filter sieve while the pulp pass over said filter sieve for subsequent collection, said feed tube having an internal diameter which is substantially equal to a diameter of said grating disc; at least one knife provided in said feed tube and having an upwardly directed cutting edge, said at least one knife being attached to and supported by said feed tube, said food pusher being formed so as to pass downwardly past said at least one knife so that a downward movement of said food pusher causes fruit and vegetables to be cut by said cutting edge of said at least one knife and pressed onto said grating disc, while said fruit and vegetable is held against rotation by said at least one knife.

2. A fruit and vegetable juicer as defined in claim 1, wherein said tube is provided with a plurality of such knives, said food pusher being formed so as to pass downwardly past said plurality of knives.

3. A fruit and vegetable juicer as defined in claim 1, wherein said food pusher is bifurcated so as to pass downwardly past said at least one knife.

4. A fruit and vegetable juicer as defined in claim 1; and further comprising a grating dish having an axis, said grating dish having a center and being provided at said center with means for removing part of fruit or vegetable lying at least close to said axis of said grating dish.

5. A fruit and vegetable juicer as defined in claim 4, wherein said means for removing of said grating dish is formed as a means for abrading part of the fruit or vegetable.

6. A fruit and vegetable juicer as defined in claim 4, wherein said means for removing include a triangular piece having sharpened upper edges sloping upwardly to said axis of said grating disc.

7. A fruit and vegetable juicer as defined in claim 6, wherein said triangular piece is composed of steel.

8. A fruit and vegetable juicer as defined in claim 1, wherein said at least one knife includes at least two separate parts each attached to said feed tube and projecting into said tube, said grating disc being conical and having a surface sloping upwardly toward said axis.

\* \* \* \* \*